United States Patent [19]
Bodensohn

[11] Patent Number: 5,693,237
[45] Date of Patent: Dec. 2, 1997

[54] METHOD OF PRODUCING INTEGRATED ACTIVE-MATRIX LIQUID CRYSTAL DISPLAYS

[75] Inventor: Alexander Bodensohn, Offenbach, Germany

[73] Assignee: Daimler-Benz Aktiengesellschaft, Stuttgart, Germany

[21] Appl. No.: 553,422

[22] PCT Filed: May 26, 1994

[86] PCT No.: PCT/EP94/01709

§ 371 Date: Jan. 16, 1996

§ 102(e) Date: Jan. 16, 1996

[87] PCT Pub. No.: WO94/28460

PCT Pub. Date: Dec. 8, 1994

[30] Foreign Application Priority Data

May 29, 1993 [DE] Germany .................... 43 18 022.1

[51] Int. Cl.⁶ .................... H01L 21/00; B44C 1/22
[52] U.S. Cl. .................... 216/23; 216/2; 216/41; 216/33; 156/657.1; 156/659.11; 156/633.1
[58] Field of Search .................... 216/2, 23, 33, 216/41; 156/633.1, 657.1, 659.11

[56] References Cited

FOREIGN PATENT DOCUMENTS

| | | |
|---|---|---|
| 0407993 | 1/1991 | European Pat. Off. . |
| 0530972 | 3/1993 | European Pat. Off. . |
| 0586147 | 3/1994 | European Pat. Off. . |
| 2555844 | 6/1977 | Germany . |
| 3-100516 | 4/1991 | Japan . |
| 4-128717 | 4/1992 | Japan . |
| 2204980 | 11/1988 | United Kingdom . |

OTHER PUBLICATIONS

Salerno et al, "Single-Crystal Silicon Transmissive AMLCD", SID Digest, 1992, pp. 63–66.

A. Soederbaerg: "Investigation of Buried Etch Stop Layer in Silicon Made by Nitrogen Implantation". In: Journal of the Electrochemical Society, vol. 139, No. 2, Feb. 1992, Manchester, US, pp. 561–566.

*Primary Examiner*—William Powell
*Attorney, Agent, or Firm*—Spencer & Frank

[57] ABSTRACT

The invention pertains to a process for producing integrated active-matrix liquid crystal displays with a checkered silicon die subdivided into picture elements. Each picture element consists of a light-controlling element and an integrated, driving electronic switching element (20) which drives the translucent electrode (16) of the picture element. The array of picture elements is covered with glass layers (6, 12) with polarizing and analyzing layers on their outer faces. The invention in characterized in that the switching elements are integrated into a transparent silicon layer in which optic windows for the lighting-controlling elements are integrated. This is done by etching out a cavity in the rear side of the silicon die in the region of the liquid crystal display, leaving a thin layer of silicon or no silicon at all in the region of the optic window. On the thicker frame (10) of the silicon die there is a drive circuit.

11 Claims, 8 Drawing Sheets

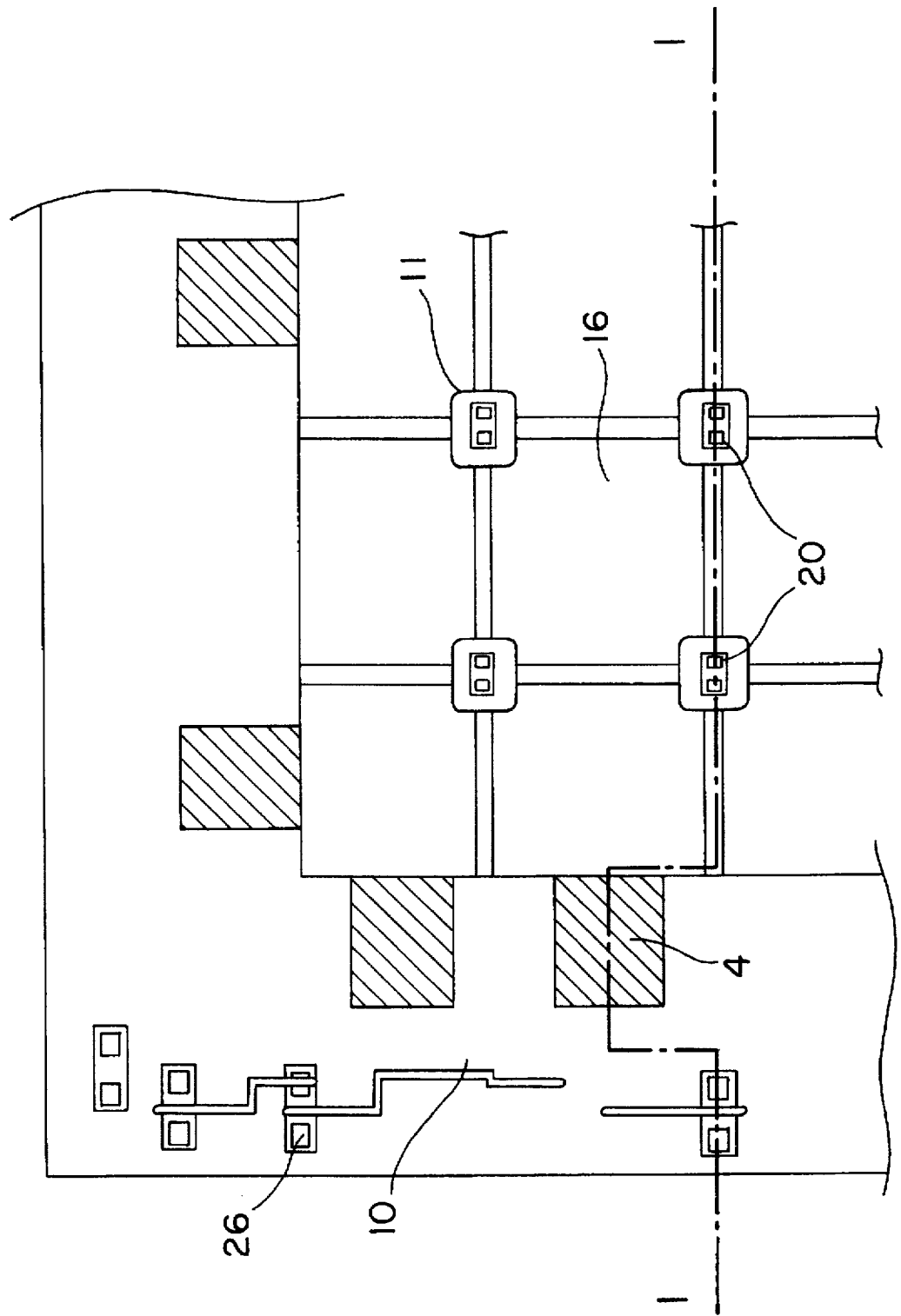

METHOD OF PRODUCING INTEGRATED ACTIVE-MATRIX LIQUID CRYSTAL DISPLAYS

The invention relates to a method of producing integrated active-matrix liquid crystal displays (AMLCD) having a monocrystalline silicon disk which is divided, in checkerboard fashion, into image points, wherein each image element comprises a light valve which is constructed from a liquid crystal layer, orientation layers, electrodes and polarization filters and an actuating electronic circuit which is produced in an integrated construction on the top side of the silicon disk and actuates a transparent electrode of the image element. A production method which will be described in detail below as prior art is known from the publication by Salemo, J. P. et al, "Single-Crystal Silicon Transmissive AMLCD" Proceedings of the SID 1992, Digest pp. 63–66.

In the known method, circuits are embodied in a thin, recrystallized polysilicon layer on a silicon wafer. This layer system is applied upside-down on a glass substrate, and the silicon substrate is extensively stripped. The AMLCD cell is completed by a second glass plate and further standard process steps of display technology.

In the described method, the transistors are produced in a recrystallized poly-Si layer. Consequently, the components have poorer electrical properties in comparison to those which are produced in monocrystalline layers. Furthermore, all of the produced components have the same thickness, which leads to limitations in the selection of components and the circuits to be embodied. Moreover, costly conventional cell technology must be used to complete the display cell.

The object of the invention, therefore, is to develop a method of integrating electronic components into AMLCDs with which the actuation electronics and the image elements of the display can be produced cost-effectively.

A liquid crystal display apparatus in which display elements are etched out of silicon on a semiconductor disk and driver and actuator circuits are integrated onto the remaining webs is known from Japanese Application JP 3-100 516 A, with English abstract in Pat. Abstr. Jap., P-1229, Jul. 22, 1991, Vol. 15, No. 287. In this production method, the monocrystalline silicon disk is adhered by one side to a quartz disk and then ground down to a thickness of approximately 2 µm. The display elements are subsequently etched out and the driver circuits are then integrated into the silicon webs. Afterward, display cell is completed.

A liquid crystal display element in which circuits and image element electrodes are also applied to the frame driver which remains after the etching out of the optical windows is also described in Japanese Application JP 4-128 717 A with English abstract in Pat. Abstr. Jap., P-1406, Aug. 20, 1992, Vol. 16, No. 393.

In the prior art known up to this point, no measures have been made known for integrating only the circuits in the production of AMLCDs in monocrystalline silicon.

SUMMARY OF THE INVENTION

According to the invention, the above object is achieved according to the present invention for an integrated active-matrix liquid crystal display of the type mentioned above by a method which comprises:

(a) producing the actuator electronics on the monocrystalline silicon disk with image point transistors and image point electrodes;

(b) preparing windows, disposed in a checkerboard fashion, in the silicon, by means of a structured mask, for later application of the light valves on the top side;

(c) cutting trenches into the top side of the silicon disk, for later filling with liquid crystals;

(d) covering the silicon disk on the top side with a first glass disk using an adhesive;

(e) etching the silicon disk, with the use of an etch-stop method, employing a pattern created in a masking layer on the underside of the silicon disk, thereby to create recesses in the silicon disk which are permeable to light in the visual wavelength range;

(f) inserting an orientation layer into the recesses for producing the light valves;

(g) covering a second glass disk on the underside with a polarization filter and on the top side with an electrode and an orientation layer;

(h) inserting the second glass disk into the recesses, with the second glass disk being maintained at a defined distance from the image point electrodes by spacers, and with a defined depth of the light valves being achieved by the spacers; and, (i) evacuating, by way of the trenches, the space between the electrodes, filling the spaces with liquid crystals, and hermetically sealing the space.

In a wafer processed with the production methods known from microelectronics, the wafer including actuator electronics, image point transistors and electrodes, a standard method is used to produce small trenches on the surface of the top side. These trenches can also be selectively replaced by trenches on the underside with suitable masking of the later etching process. On the rear side, the disk is covered with a masking layer, and a glass disk is applied on the top side by means of an adhesive applied over the entire surface. The silicon layer is locally etched anisotropically over a pattern created in the lower-side masking layer. This process is interrupted as soon as the remaining silicon layer, hereinafter referred to as active silicon layer, has become permeable to light in the visual wavelength range in the region of the formed recess, or is completely dissolved.

This is achieved with the use of known etch-stop methods. Following the application of the known auxiliary layers necessary for display technology—e.g. for orienting the liquid crystals—to the floor of the recess and its processing, a further glass disk is inserted into the recess, on which disk a polarization filter, an orientation layer and a throughgoing backplane electrode are applied in steps which are likewise known. This second glass plate is maintained at the proper distance, for example 6 µm, from the thin, active layer by distancing elements (spacers) that can also be configured from silicon structures. The intermediate space which has been created between the active layer and the second glass plate is now evacuated by the trenches produced in the standard process, then filled with liquid crystals with the use of known methods, and hermetically sealed.

This construction permits actuation of the liquid crystals in such a way that a transmission of light for the image point is achieved or prevented when the image point electrodes are suitably actuated with the aid of the actuating electronics integrated in the standard method. Whereas the image point transistors are disposed directly adjacently to the image points in the region of the thin silicon layer, the associated drivers are located in the thicker edge region of the silicon wafer.

The advantages of the invention are as follows:

1. Image point transistors of monocrystalline material achieve higher operating frequencies in comparison with polycrystalline transistors. They have less variation in characteristics and lesser parasitic effects. Moreover, this technique permits a lower space requirement for the individual image point transistors and thus a higher resolution.

2. The integration of actuator circuits in the monocrystalline frame which remains in etching out of the inner surface provided for the image point transistors permits a conventional circuit design which requires little space, that is, which has a higher complexity. Again, test circuits which permit a test prior to final assembly can consequently be integrated.

3. The silicon mechanical frame allows a simpler assembly technique in which contacting is also effected with high reliability and high mechanical stability.

BRIEF DESCRIPTION OF THE DRAWINGS

A preferred embodiment of the invention is now to be described in detail below in conjunction with the drawing, wherein:

FIG. 8 shows a cutout of the Si trough with windows.

DETAILED DESCRIPTION OF THE PREFERRED EMBODIMENTS

Figure 1:
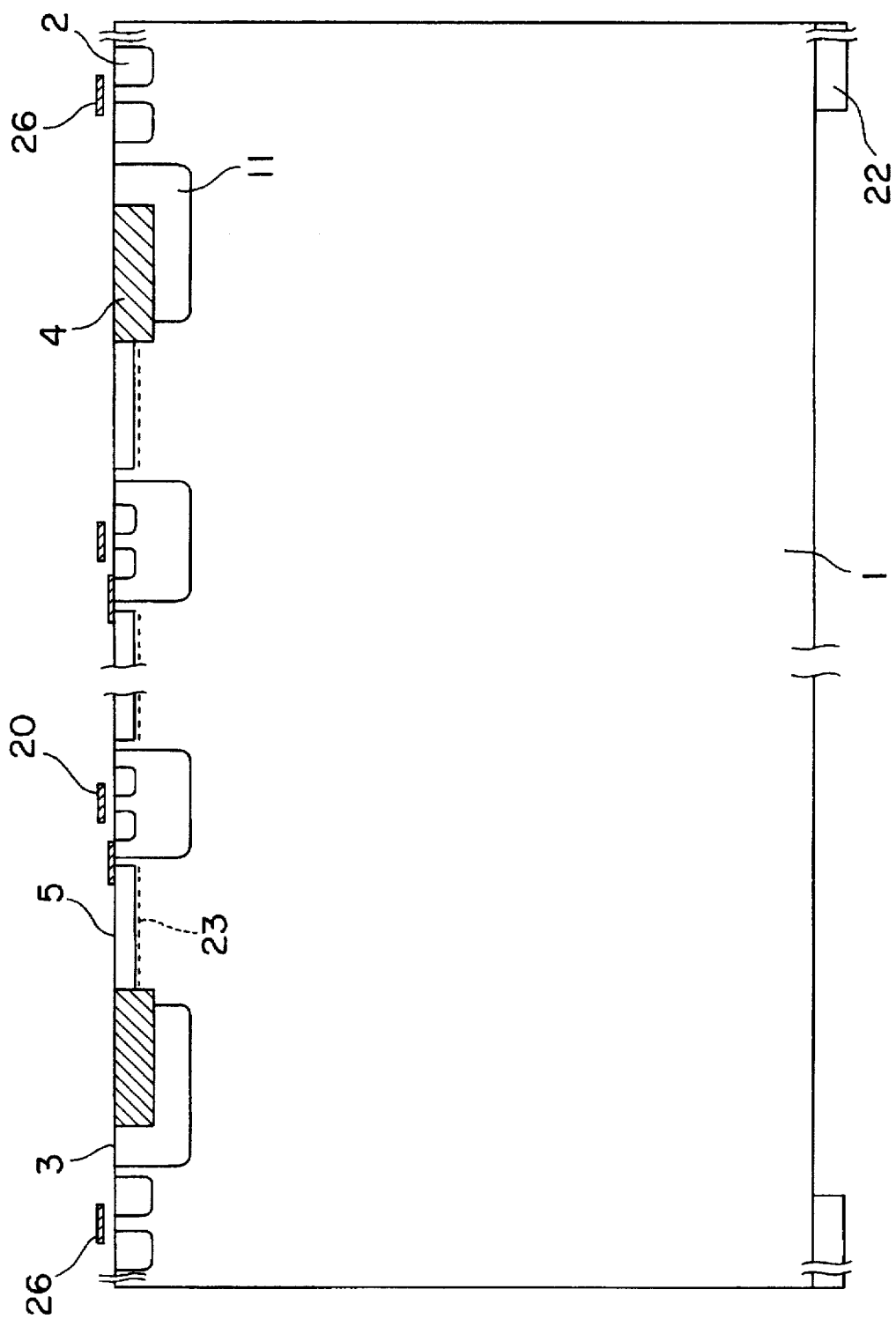
FIG. 1 shown in section, the state of the silicon disk at the beginning of processing according to the invention.

In the initial state shown in FIG. 1, the silicon base material 1 and the doping material troughs 2 formed or inserted in this material by means of the known doping and diffusion processes can be seen. Image point transistors, image point electrodes and actuator circuits have been created in the process. The section through the silicon disk extends along the line 1—1 in FIG. 8.

Also shown are the trenches 4 on the Si surface 3, which have been created by etching and are used later to evacuate the display chamber. An etch-stop layer 23, which in this state has already been applied by known steps (for example local implantation of oxygen or nitride), can selectively be located near the surface (approximately 0.4–1 μm).

Figure 2:
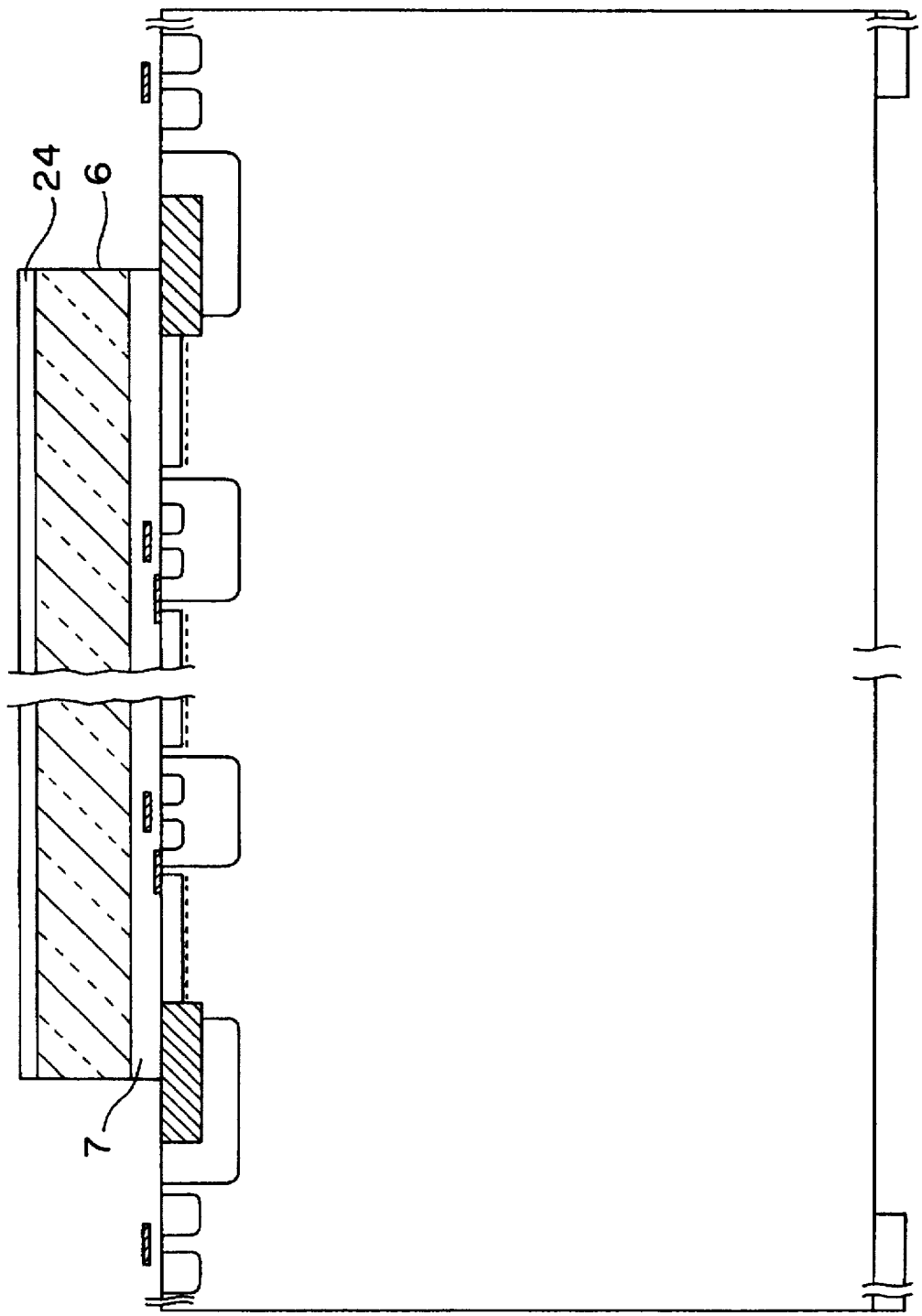
FIG. 2 shows the structure following application of the first glass disk and prior to etching.
Figure 3:
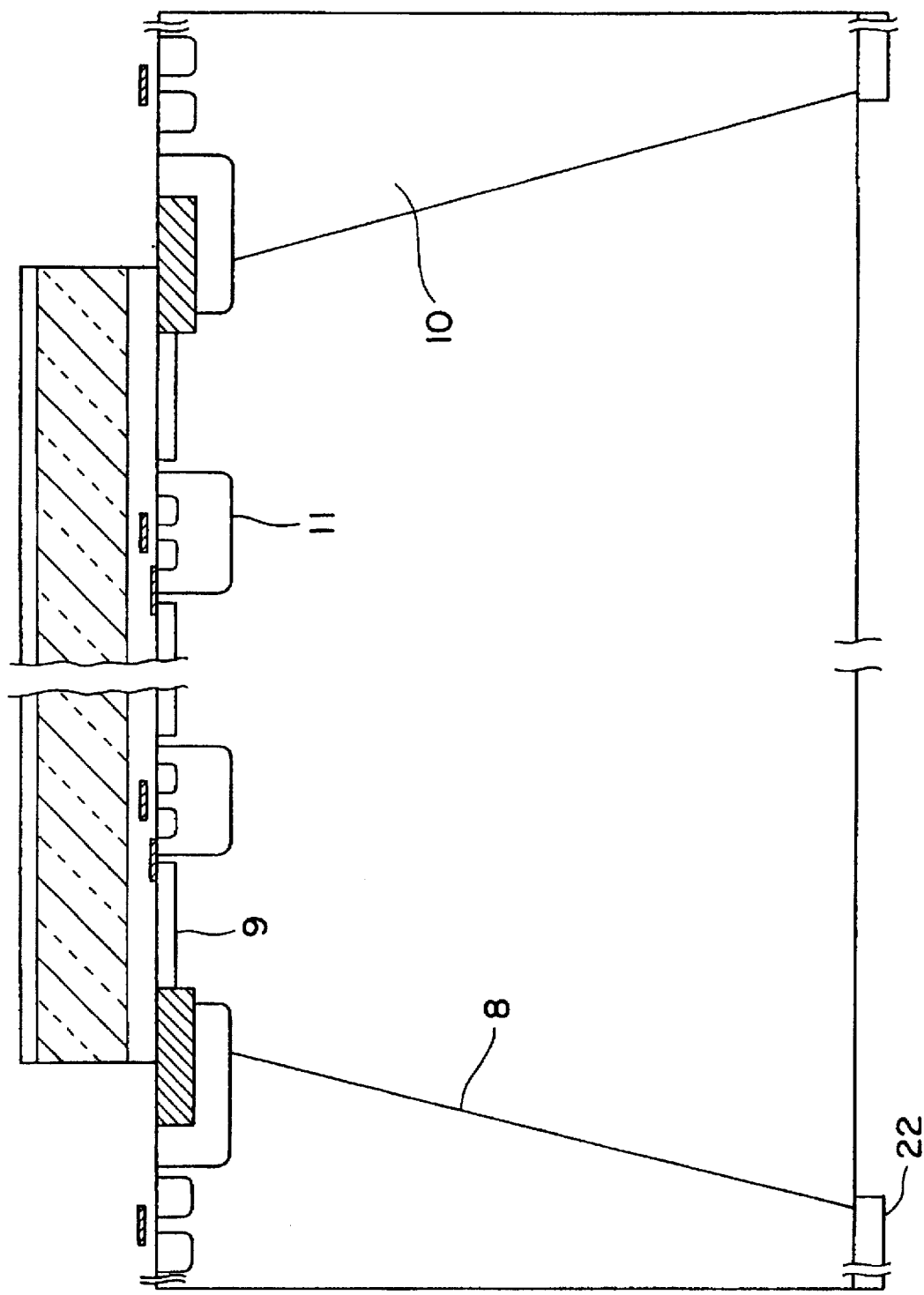
FIG. 3 shows the structure following etching.

FIG. 2 shows the next step, in which an upper glass plate 6 is applied to the surface of the silicon disk 1 by means of a transparent adhesive 7 applied to the entire surface. An analyzer layer is indicated by 24. Accordingly, the center part of the silicon disk is etched out up to an edge region over a nitride mask 22 structured on the rear side of the silicon disk. As FIG. 3 shows, an etching trench is created whose walls 8 lie in the (111) planes with the use of (100) oriented silicon base material and anisotropic etching with, for example, a KOH solution. Regions 10 are created which have the full thickness of the initial material. These regions form a stable frame in the edge region of the silicon wafer. It is possible to purposefully stop the etching process in many ways. For example, methods are known in which suitable etch-stop layers 23 are created by means of doping. Also known are methods in which the etching process is controlled by light from the top side of the Si disk. In crystalline silicon, etching takes place until the Si is transparent to optical light. In this way, an Si membrane 9 can remain as an embodiment having a thickness of a few hundred nanometers.

Troughs which have been created by doping can also be seen in FIG. 3 as protrusions 11 that are intended to assure the defined distance of the second glass disk 12 (FIG. 5) from the membrane/cover glass layer system.

Figure 7:
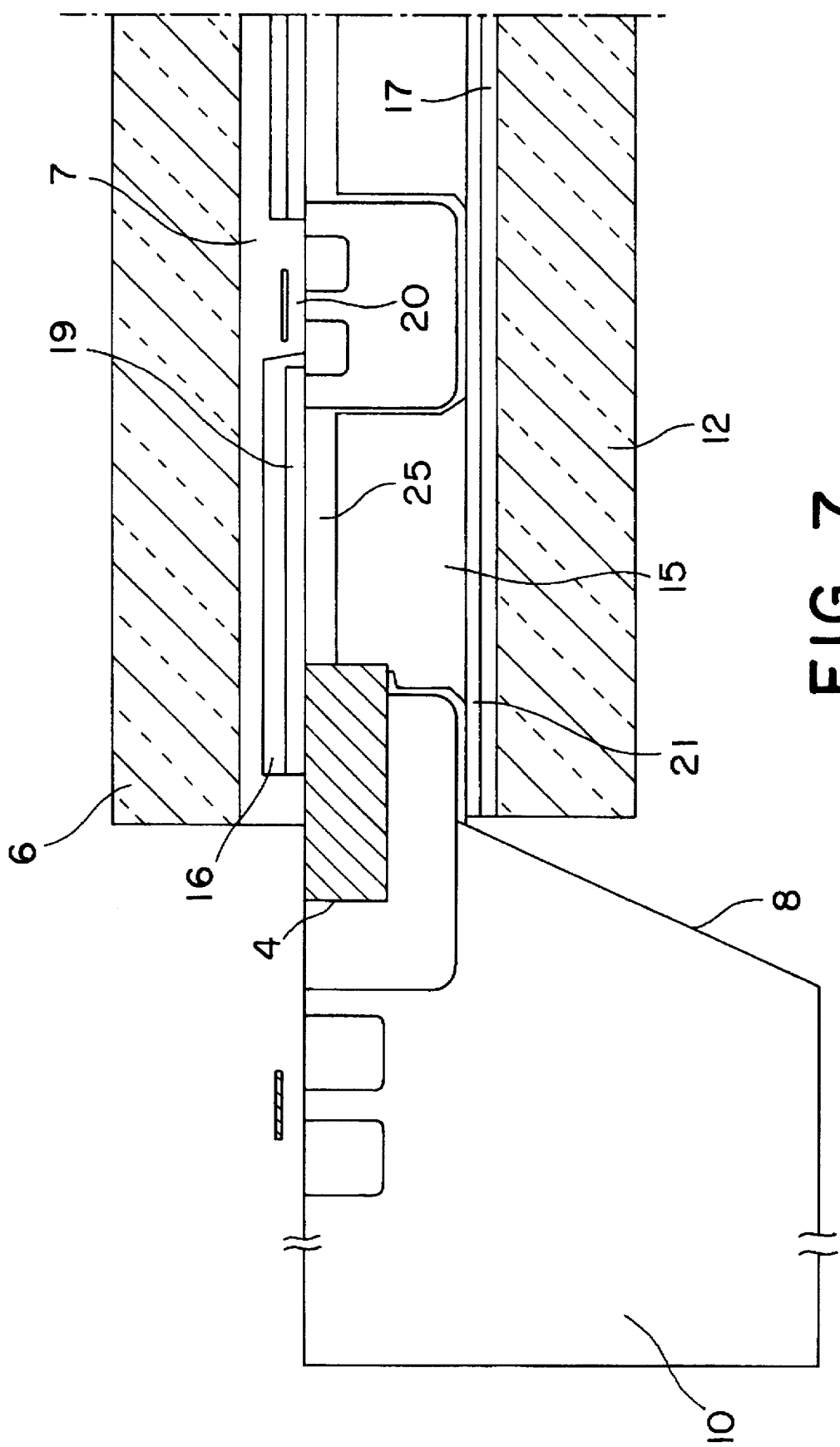
FIG. 7 shows a preferred alternative embodiment for the light-controlling element.

In a preferred embodiment—as shown in FIG. 7—the membrane comprises an $Si_3N_4$ layer 19 (or a series of layers of CVD oxide and CVD nitride). This membrane is retained later during etching (due to the low etching rate of KOH with nitride and selective etching of the recess from the underside). The silicon is therefore completely removed in the image point. The nitride layer can already be applied very thinly during the standard process sequence. The transparent image point electrode 16, preferably made of indium tin oxide (ITO), is structured from the top side on this $Si_3N_4$ layer.

Figure 4:
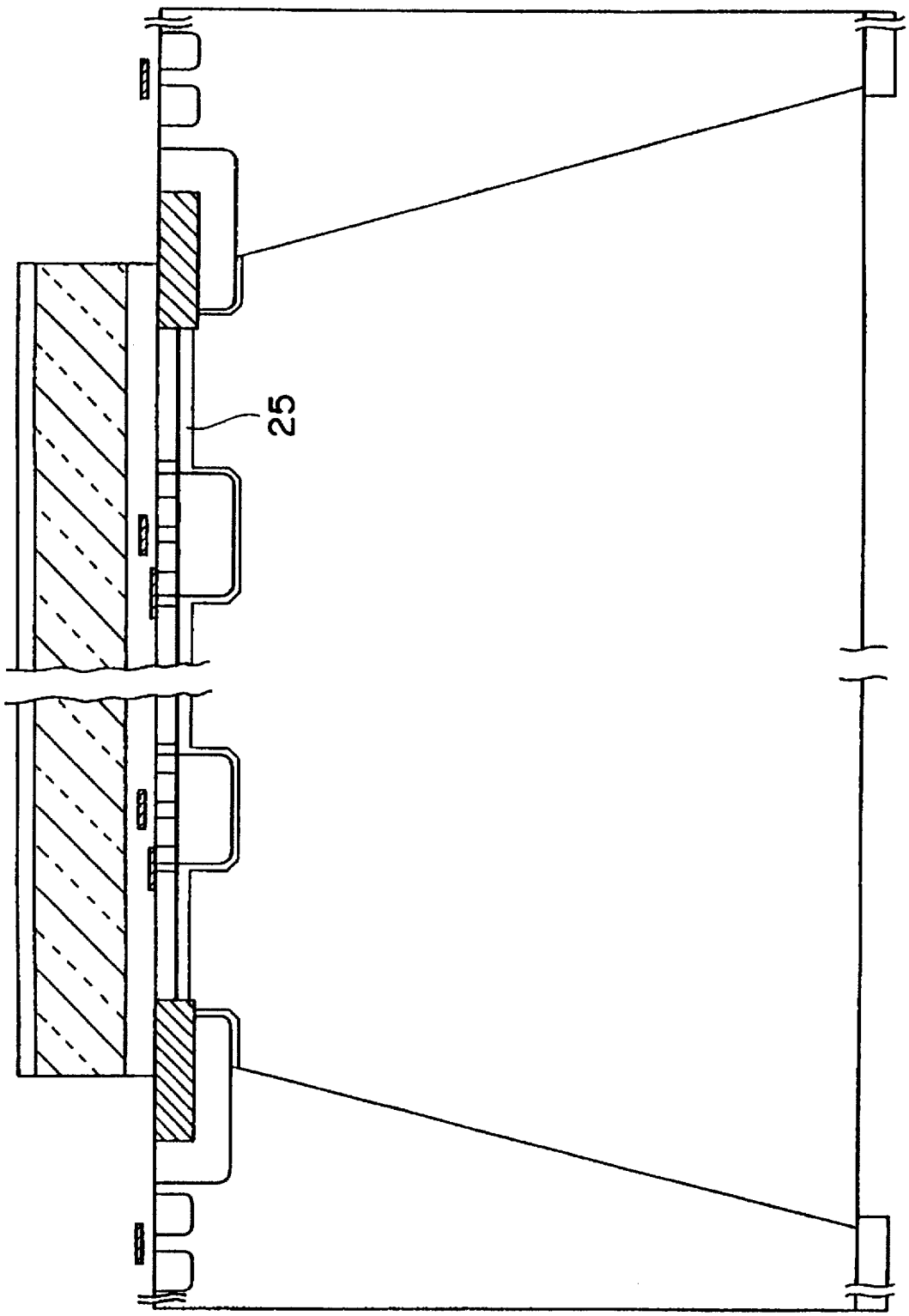
FIG. 4 shows the state following application of the orientation layer.

The application of the orientation layer 25 is completed in FIG. 4 (see also FIG. 7).

Figure 5:
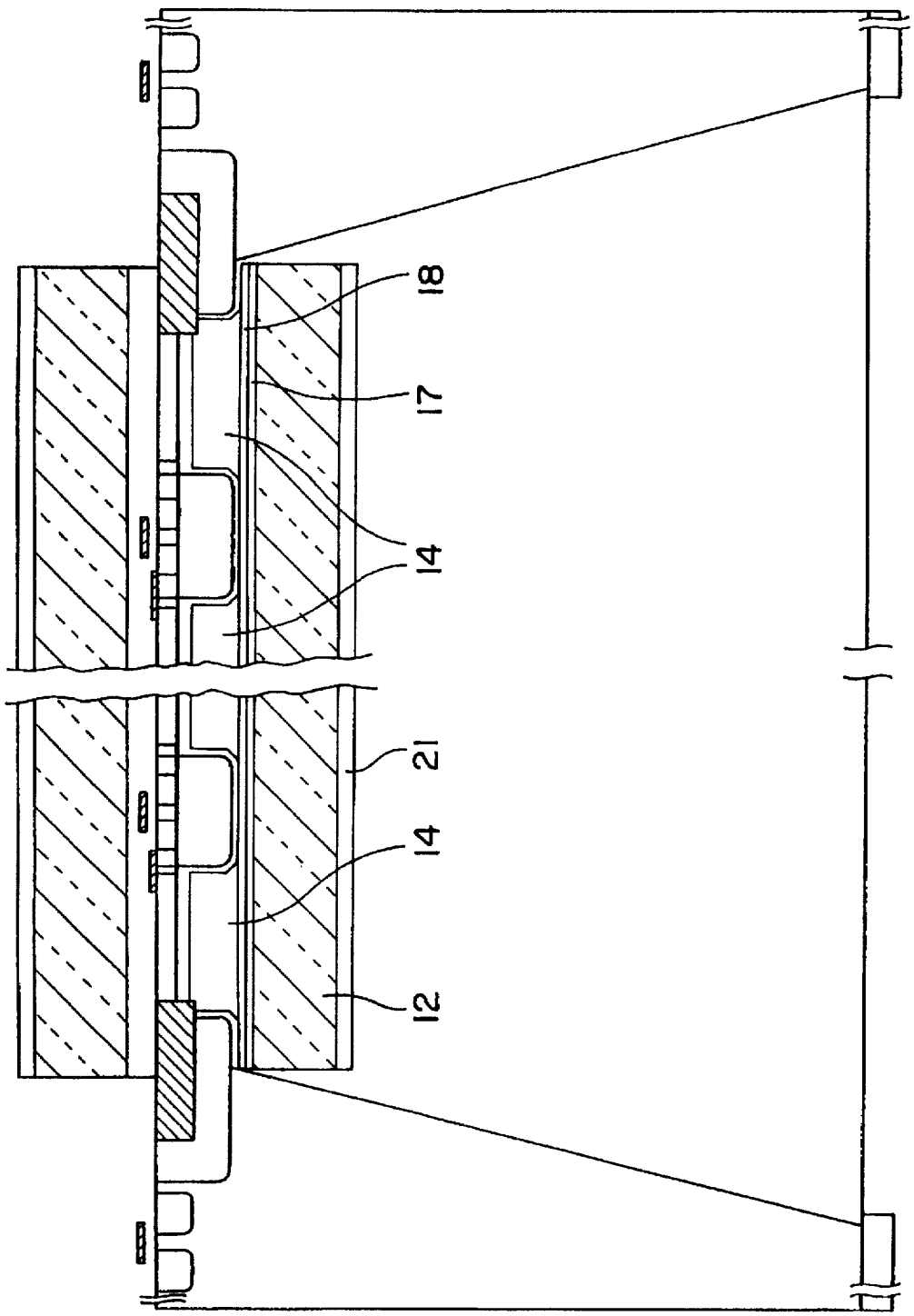
FIG. 5 shows the state following insertion of the second glass disk.
Figure 6:
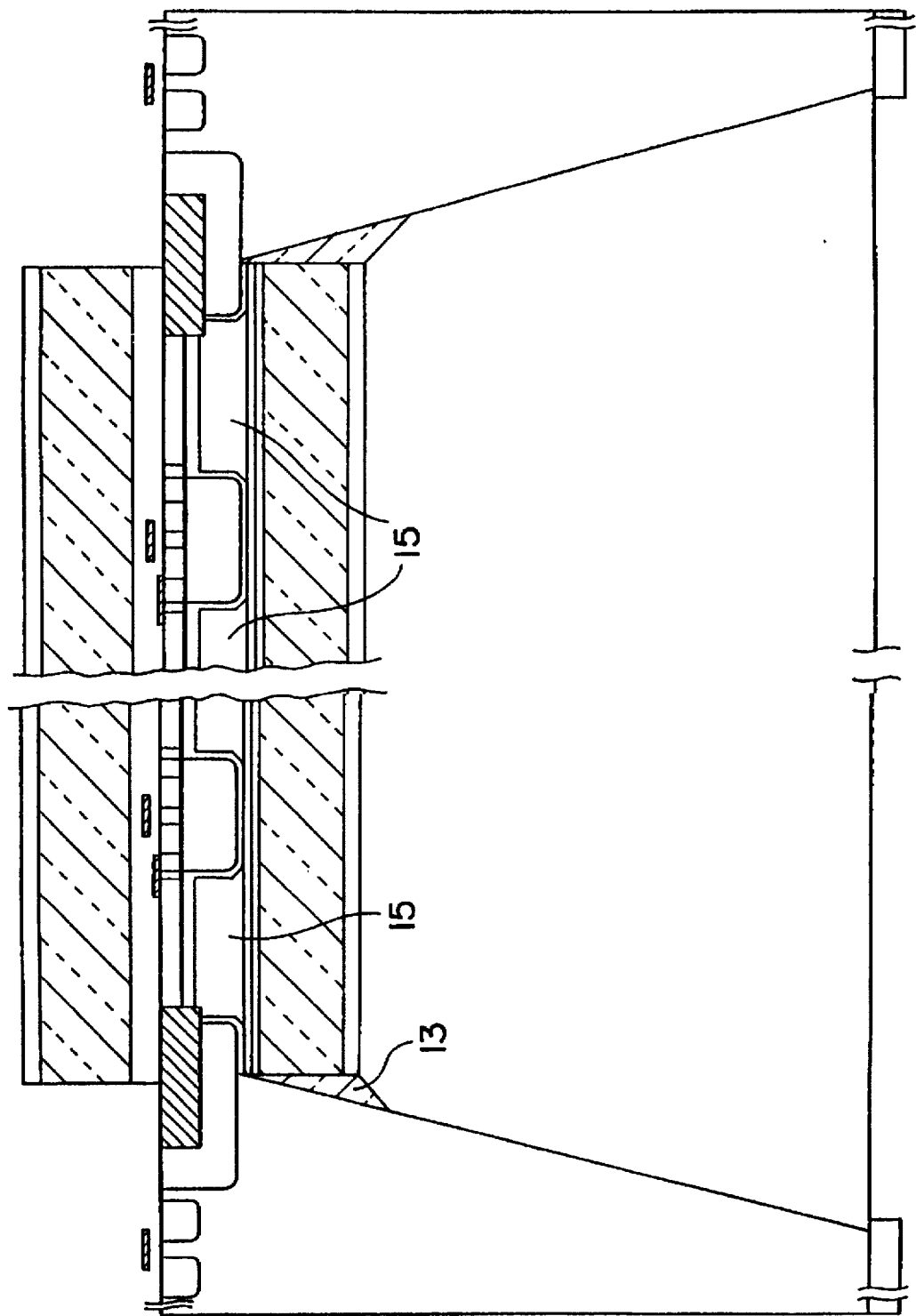
FIG. 6 shows filling of the intermediate space with liquid crystal.

FIG. 5 shows the structure following the insertion of the second glass disk 12. The glass disk itself is covered with an identical orientation layer 18 for the liquid crystals and with a transparent backplate electrode 17. As is conventional, polarizer and analyzer layers 21 and 24 (see FIG. 2) are applied to the outwardly-oriented surfaces. The transition from the glass disk 12 to the Si wall can now be sealed, as shown at 13 in FIG. 6.

After evacuation by way of the trenches 4 mentioned at the outset, liquid crystal 15 penetrates the hollow spaces 14.

FIG. 7 shows the above-described preferred embodiment of the image point electrode. Because the two glass disks 6 and 12 are sufficient for stability, it is possible to etch the silicon disk down to a layer thickness of only 0.5 μm in the region of the windows for the image points 5, or to completely remove the silicon there according to FIG. 7.

A transistor 20 which can be configured as a MOS transistor, even in Si layers of less than 1 μm, is provided on the side or in the corner of each of the image points 5 disposed in checkerboard fashion according to FIG. 8. In contrast, the actuator electronics 26 can be produced in the region of the webs and at the edge using any conventional technique. From this point on, the process steps for producing the windows in the silicon, and the further processing to form an LCD element, take place at essentially lower temperatures and do not require any extremely strict spatial conditions.

When the term "in checkerboard fashion" is used in the application, what is meant are regular, total-surface arrangements, that is, division into, for example, triangles.

I claim:

1. Method of producing integrated active-matrix liquid crystal displays having a monocrystalline silicon disk which is divided, in checkerboard fashion, into image points, wherein each image element comprises a light valve which is constructed from a liquid crystal layer, orientation layers, electrodes and polarization filters and an actuating electronic circuit which is produced in an integrated construction on the top side of the silicon disk and actuates a transparent electrode of the image element, the method comprises the steps of:

(a) producing the actuator electronics on the monocrystalline silicon disk with image point transistors and image point electrodes;

(b) preparing windows, disposed in a checkerboard fashion, in the silicon by means of a structured mask; for later application of the light valves on the top side;

(c) cutting trenches into the top side, for later filling with liquid crystals;

(d) covering the silicon disk on the top side with a first glass disk by means of an adhesive;

(e) etching the silicon disk with the use of an etch-stop method employing a pattern created in a masking layer on the underside, thereby to create recesses in the silicon disk which are permeable to light in the visual wavelength range;

(f) inserting an orientation layer into the recesses for producing the light valves;

(g) covering a second glass disk on the underside with a polarization filter and on the top side with an electrode and an orientation layer;

(h) inserting the second glass disk into the recesses, with the second glass disk being maintained at a defined distance from the image point electrodes by spacers, and a defined depth of the light valves being achieved by the spacers; and (i) evacuating, by way of the trenches, the space between the electrodes, filling the spaces with liquid crystals, and hermetically sealing the space.

2. Method according to claim 1, wherein the silicon is etched down to a thin layer in the region of the image points.

3. Method according to claim 1, wherein the silicon layer has a thickness of 0.4–1 µm.

4. Method according to claim 1, wherein the entire silicon disk is etched down to a thickness of less than 2 µm in the region of the image points so that a frame remains all around, in which frame there are disposed the driver circuits for actuating the circuit elements, particularly image point transistors in an integrated technique.

5. Method according to claim 1, wherein the frame is used in the outer edge to contact the driver circuits located on the silicon disk.

6. Method according to claim 1, wherein the frame is used for mechanical holding and assembly of the active-matrix liquid crystal displays.

7. Method according to claim 1, wherein the spacers are small spheres having a defined radius.

8. Method according to claim 1, further comprising inserting doping material troughs into the silicon layer such that protrusions having a defined height are retained during later anisotropic etching, said protrusions serving as spacers for the later assembly of the LCD cells.

9. Method according to claim 1, wherein the silicon layer is completely removed locally in the image points during anisotropic etching so that only one layer system of insulators and a transparent electrode remain.

10. Method according to claim 1, wherein the trenches are cut during anisotropic etching by a suitable form of a structuring on the top side of the Si disk.

11. Method according to claim 1, wherein the trenches are cut during anisotropic etching by a suitable form of a structuring on the underside of the Si disk.

* * * * *